Jan. 22, 1957 M. SATROM ET AL 2,778,553
REFUSE BAG FOR AUTOMOBILES
Filed Oct. 26, 1955
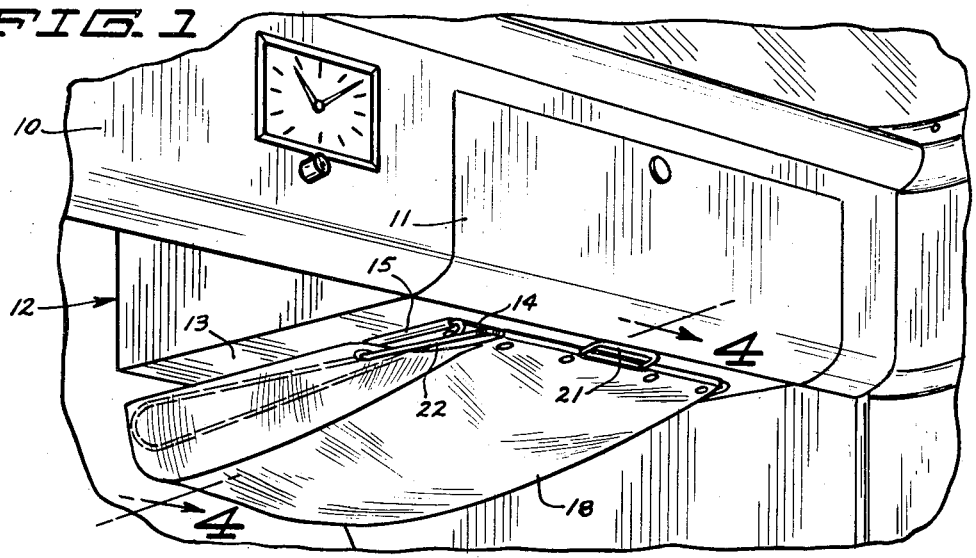
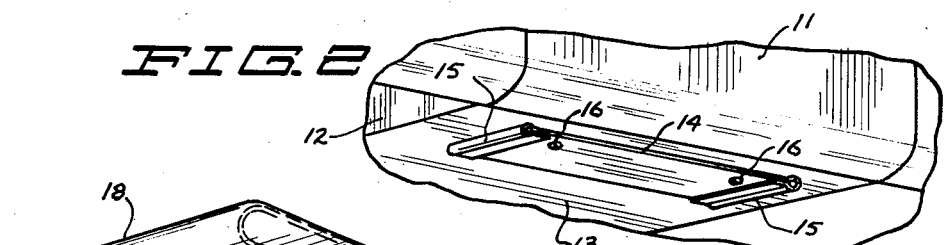
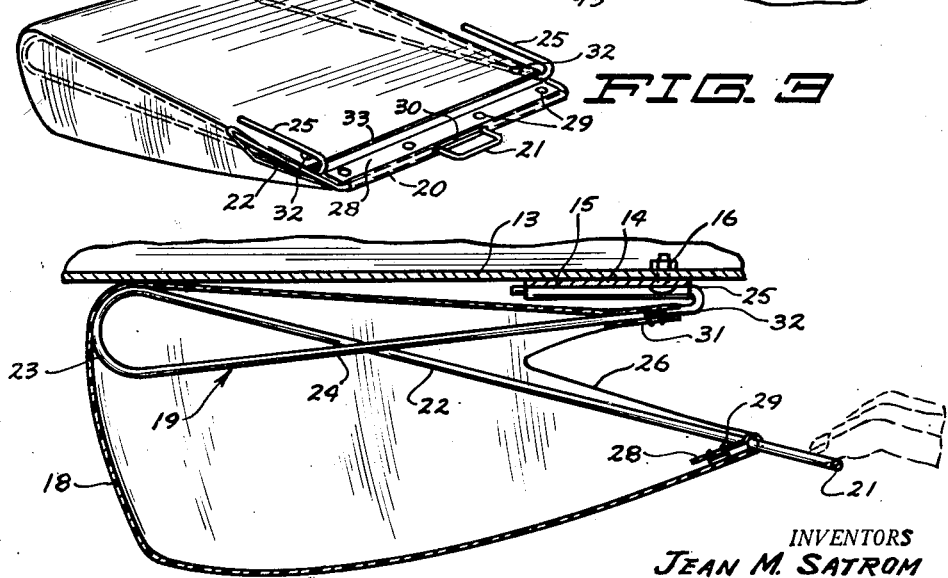
INVENTORS
JEAN M. SATROM
BY MARLYN SATROM
Carleen F Hagle
ATTORNEYS

United States Patent Office 2,778,553
Patented Jan. 22, 1957

2,778,553

REFUSE BAG FOR AUTOMOBILES

Marlyn Satrom and Jean M. Satrom, Rochester, Minn., assignors to Satrom Company, Inc., Minneapolis, Minn., a corporation of Minnesota Application October 26, 1955, Serial No. 542,845

7 Claims. (Cl. 224—42.42)

This invention relates generally to receptacles and more particularly to a bag for refuse which is designed for mounting in an accessible position within an automobile.

With increasing comforts afforded by automobile travel the problem of refuse disposal by driver and passengers has become of greater concern. Napkins, tissues, empty containers, wrappers and the like are quick to accumulate, particularly on extended trips. Obviously, in the interests of sanitation and in maintenance of attractive roadways, such refuse should not be discharged from the vehicle during travel. Yet the interior of the conventional automobile is normally unequipped with a suitable depository for receiving discarded items.

With this in mind the principal object of the present invention is to provide a refuse receptacle adapted to be removably attached to the underside of the instrument panel of the automobile in a convenient accessible position for the driver and passengers.

Another and more specific object of the invention is to provide a refuse or litter bag for automobiles, the bag having a rigid frame for distending the bag and said frame providing a rigid support for the bag opening allowing the bag to be readily opened and closed.

Another object of the invention is to provide an automobile refuse receptacle which is attractive in appearance and yet which can be manufactured at a very reasonable cost.

With these objects in view the invention broadly comprises an open mouthed bag of flexible material, an interior frame for maintaining the bag in distended condition which comprises a single length of relatively stiff yet resilient wire so configured as to have its central portion extending generally crosswise along the open mouth of the bag, the outer portions of the wire adjacent the central portion at each side thereof each extending into the bag nearly to the bottom thereof, then being bent back upon itself and extending back to a point adjacent the wire central portion, a mounting plate adapted to be attached to the underside of an automobile dashboard or instrument panel and presenting a pair of transversely spaced sockets, and the terminals of said wire formed to be removably inserted in said sockets whereby the bag will be supported in a generally horizontal position under said dashboard with the mouth of the bag facing rearwardly in the automobile, and means for detachably securing the bag to the frame.

The above mentioned and still additional objects of the invention will be brought to light during the course of the following specification, reference being made to the accompanying drawing, in which—

Fig. 1 is a perspective view of the bag shown in mounted position on the underside of an automobile glove compartment.

Fig. 2 shows the mounting plate with the bag removed.

Fig. 3 is a perspective view of the bag as it appears when dismounted.

Fig. 4 is a longitudinal vertical section through the bag taken on line 4—4 of Fig. 1 and showing the bag in open condition.

Referring now more particularly to the drawing reference numerals will be used to denote like parts or structural features in the different views. In Fig. 1 we have shown a portion of the front instrument panel 10 which extends across the front of the interior passenger compartment of an automobile. The panel is provided with a door 11 allowing access to the glove compartment 12 which lies forward of the panel 10. The bottom wall of the glove compartment 12 is denoted by the numeral 13.

As shown, our bag is designed to lie against the underside of wall 13 in an out of the way but conveniently accessible position. The bag is attached to wall 13 by means of a mounting plate 14, the design of which may best be understood by observation of Fig. 2. Plate 14 is comprised of a strip of rigid metal with its end portions looped back upon themselves to form a pair of spaced parallel tubular sockets 15. The plate may be attached to wall 13 as by bolt and nut assemblies 16 and the plate is mounted so that the axes of sockets 15 lie at right angles to the front face of the panel 10.

The refuse bag is designated by the number 18 and this is held in the desired position against the underside of the glove compartment by means of a frame denoted generally by the numeral 19. This frame is preferably formed of a single strand of relatively rigid wire and has a general U-shape. Inasmuch as the two sides of the frame are identical only one side need be described in detail.

At the longitudinal center of the wire strand the frame portion which might be referred to as the front lip is formed. This lip is designated by the numeral 20 and extends transversely substantially the distance between the tubes 15 in the mounting plate. If desired a small handle 21 may be formed in the center of lip portion 20. While handle 21 is not absolutely essential it does facilitate opening the bag and might serve as a suitable place for applying the trade-mark for the article. Beyond the central lip portion 20 the wire is configured to extend at right angles to said portion as at 22 for a distance equal to the desired depth of the bag. It is then bent in a broad loop as at 23 and back as at 24 to a point just short of the lip portion 20 and inside of the portion 22. The terminal of the wire is then bent substantially back along and above the portion 24 in the form of a terminal finger 25 which is insertable for a snug fit within one of the tubes 15. Inasmuch as the two sides of the frame are identical there is a finger 25 at each side and these are of course parallel and spaced apart the same distance as the tubes 15. The frame portions made up of the wire segments 24 and fingers 25 might be referred to collectively as the upper or fixed jaw or frame section while the interrelated portions 20, 21 and 22 might be referred to collectively as the lower or movable jaw or frame section, the two jaws or sections being interconnected by resilient loops 23.

The receptacle 18 is an open mouthed bag of flexible material such as cloth or plastic. The bag is adapted to be placed over the extended looped portions of the frame with the open end thereof toward the handle 21. The side walls of the bag are preferably cut away as at 26 adjacent the bag opening. The edge of the bag which defines the bottom of the mouth thereof is provided with a flap 28 adapted to be folded over the lip portion 20 of the frame and secured as by snap fasteners 29. The material is slotted as at 30 along the fold line of the flap 28 to allow the handle 21 to extend therethrough. A small side flap 31 is provided at the upper edge of each cut out 26 and this is fastened around the frame portion 24 as by snap 32. It will be observed that the lip portion 20 lies outwardly somewhat beyond the upper edge 33 of the bag mouth.

In mounting the device the plate 14 is first attached to the wall 13 as shown in Fig. 2 with the elongated sockets 15 extending in a fore and aft direction. The rear edge of the plate is spaced just forwardly of the bottom edge of glove compartment door 11. The bag 18 is placed upon the frame 19 being pulled over the loops 23 and flaps 28 and 31 are respectively fastened around the frame portions 20 and 24. So fastened the bag is securely attached to the frame in the condition shown in Fig. 3. The device is then mounted as shown in Fig. 1 by sliding the fingers 25 forwardly into the sockets 25. So mounted the bag is held against the wall 13 with only the handle 21 thereof projecting rearwardly beyond the compartment door 11.

The wire of which frame 19 is formed is sufficiently resilient so that the bends connecting portions 24 and 25 when spread slightly to insert the fingers 25 will yieldably hold the loop portions 23 against the wall 13. Similarly loops 23 serve as springs which retain the bag in a closed condition. It will be understood that when the handle 21 is pressed downwardly, as in Fig. 4 to open the bag, the loops 23 will be contracted against their normal bias and as the handle is released the tension in the loops will return the lip portion 20 to its upper or closed position. With the sides of bag 18 cut away as at 26 the mouth of the bag may be closed without excess bunching of the material at the sides of the device.

The convenience of the device will be readily understood. Any refuse which accumulates in the automobile can be readily deposited in the bag and so concealed from sight. Removing the device for emptying is readily accomplished by pulling the frame rearwardly toward the front seat withdrawing the fingers 25 from the sockets in the mounting plate. The bag 18 may be detached from the frame for cleaning by unsnapping the snap members 29 and 32. The device can be very economically manufactured primarily due to the fact that a single piece of wire is configured to form an effective frame without need of soldering, riveting or the like. We has thus provided a liter bag for automobiles which economically and effectively carries out the aforementioned objectives.

It is understood that suitable modifications may be made in the structure as disclosed, provided such modifications come within the spirit and scope of the appended claims. Having now therefore fully illustrated and described our invention, what we claim to be new and desire to protect by Letters Patent is:

1. A refuse bag comprising an elongated enclosure of flexible material having an opening at one end, a frame disposed within the bag and extending substantially the length thereof, said frame comprising opposing jaws resiliently interconnected for yieldable opening movement at the open end of the enclosure, said enclosure being connected to both of said jaws adjacent said open end, a handle on one of said jaws projecting outwardly beyond the enclosure opening and the other jaw, and means on the other of said jaws for detachably connecting the frame to a support means.

2. A refuse bag for automobiles comprising a mounting plate having a pair of spaced parallel elongated tubular sockets, said plate adapted to be mounted under the dashboard of the automobile with the sockets extending in a fore and aft direction, a frame formd of a single length of resilient wire, said frame having a central lip portion, the wire portions at each side of the central portion extending at right angles to the central portion, then being looped back upon themeselves to a point adjacent the central portion, then terminating in a pair of parallel fingers spaced apart equally to the sockets for removable insertion therein, and an open mouthed sack of flexible material extending over and around said looped wire portions and being detachably connected to the frame.

3. A refuse bag for automobiles comprising a mounting plate having a pair of spaced parallel elongated tubular sockets, said plate adapted to be mounted under the dashboard of the automobile with the sockets extending in a fore and aft direction, a frame formed of a single length of resilient wire, said frame having a central lip portion, the wire portions at each side of the central portion extending at right angles to the central portion, then being looped back upon themselves to a point adjacent the central portion, then terminating in a pair of parallel fingers spaced apart equally to the sockets for removable insertion therein, and an open mouthed sack of flexible material extending over and around said looped wire portions and being detachably connected to the frame, said connection being effected by means of a flap on the sack adjacent the open mouth thereof adapted to be folded around said central portion and secured to a wall of the sack.

4. A refuse bag for use in an automobile comprising a mounting plate having an elongated socket formed therein, said plate adapted to be mounted on the bottom wall of an automobile dashboard with the socket extending in a fore and aft direction, a relatively deep open mouthed bag of flexible material, and a bag frame for removably supporting the bag in a horizontal position from the plate with the bag opening facing rearwardly in yieldably closed condition, said frame comprising upper and lower frame sections extending from the bag opening into the bag and being resiliently interconnected within the bag to be yieldably held in a closed condition at the open end of the bag, the lower frame section being connected to the adjacent edge of the bag opening, the upper frame section having a finger portion extending depthwise of the bag and outside thereof, said finger portion adapted for removable insertion into the plate socket.

5. In a receptacle for use in an automobile comprising a mounting plate adapted for mounting on a fixed interior wall of an automobile and having retainer means formed therein, a bag of flexible material having an open mouth, a supporting frame for said bag, said frame comprising a fixed and a movable jaw disposed within the bag and resiliently interconnected and biased toward a relatively closed condition, opposing edges of the bag opening being attached to the jaws for opening and closing therewith, the fixed jaw having an integral extension outside of the bag for detachable fixed connection with the retainer means, and the movable jaw having a handle for manually spreading the jaws to open the bag mouth when the integral extension is connected with the retainer means.

6. A refuse bag for automobiles comprising a mounting plate having a pair of spaced parallel elongated tubular sockets, said plate adapted to be mounted under the dashboard of an automobile with the sockets extending in a fore and aft direction, an elongated frame formed of wire jaw sections swingably interconnected at one end for relative opening and closing movement of the free ends thereof, said swingable interconnection including spring means for yieldably retaining said free ends in relatively closed condition, one of said jaw sections having a handle adjacent its free end and the other of said jaw sections having a pair of parallel fingers spaced apart equally to the sockets for removable insertion therein, and an open mouthed sack of flexible material extending over and around the swingable interconnection of the sections and being detachably connected to the frame.

7. The subject matter of claim 6 wherein the fingers extend longitudinally of the frame.

References Cited in the file of this patent
UNITED STATES PATENTS

| 1,312,336 | McNaughton | Aug. 5, 1919 |
| 1,486,566 | Crecelius | Mar. 11, 1924 |
| 1,891,833 | Pawlicek | Dec. 20, 1932 |

FOREIGN PATENTS

| 761,836 | France | Jan. 13, 1934 |